(12) United States Patent
Tomkins

(10) Patent No.: US 8,334,847 B2
(45) Date of Patent: Dec. 18, 2012

(54) SYSTEM HAVING USER INTERFACE USING OBJECT SELECTION AND GESTURES

(75) Inventor: Steve Tomkins, Ottawa (CA)

(73) Assignee: QNX Software Systems Limited, Kanata, Ontario (CA)

(*) Notice: Subject to any disclaimer, the term of this patent is extended or adjusted under 35 U.S.C. 154(b) by 851 days.

(21) Appl. No.: 12/039,674

(22) Filed: Feb. 28, 2008

(65) Prior Publication Data

US 2009/0102806 A1    Apr. 23, 2009

Related U.S. Application Data

(60) Provisional application No. 60/981,464, filed on Oct. 19, 2007.

(51) Int. Cl.
G06F 3/041 (2006.01)
(52) U.S. Cl. .................................. 345/173; 345/156
(58) Field of Classification Search ............ 345/156, 345/173
See application file for complete search history.

(56) References Cited

U.S. PATENT DOCUMENTS

| | | | | |
|---|---|---|---|---|
| 5,335,276 A * | 8/1994 | Thompson et al. | ........... | 380/266 |
| 5,465,401 A * | 11/1995 | Thompson | ............ | 455/558 |
| 6,192,255 B1 * | 2/2001 | Lewis et al. | ............ | 455/558 |
| 6,707,449 B2 * | 3/2004 | Hinckley et al. | ............ | 345/173 |
| 6,791,536 B2 * | 9/2004 | Keely et al. | ............ | 345/173 |
| 6,892,359 B1 | 5/2005 | Nason et al. | | |
| 6,975,306 B2 * | 12/2005 | Hinckley et al. | ............ | 345/173 |
| 7,362,358 B2 * | 4/2008 | Nakayama | ............ | 348/229.1 |
| 7,382,358 B2 * | 6/2008 | Kushler et al. | ............ | 345/168 |
| 7,797,630 B2 * | 9/2010 | Kashi | ............ | 715/268 |
| 8,073,196 B2 * | 12/2011 | Yuan et al. | ............ | 382/103 |
| 8,120,586 B2 * | 2/2012 | Hsu et al. | ............ | 345/173 |
| 2005/0052458 A1 * | 3/2005 | Lambert | ............ | 345/440 |
| 2005/0110964 A1 * | 5/2005 | Bell et al. | ............ | 353/122 |
| 2006/0242592 A1 * | 10/2006 | Edwards et al. | ............ | 715/764 |
| 2007/0124503 A1 * | 5/2007 | Ramos et al. | ............ | 709/248 |
| 2008/0082907 A1 | 4/2008 | Sorotokin et al. | | |
| 2008/0110964 A1 * | 5/2008 | Churvis | ............ | 229/100 |
| 2008/0126387 A1 * | 5/2008 | Blinnikka | ............ | 707/102 |
| 2008/0316183 A1 * | 12/2008 | Westerman et al. | ............ | 345/173 |
| 2009/0046110 A1 * | 2/2009 | Sadler et al. | ............ | 345/660 |
| 2009/0048110 A1 * | 2/2009 | Bakker | ............ | 504/241 |
| 2009/0232367 A1 * | 9/2009 | Shinzaki | ............ | 382/124 |

FOREIGN PATENT DOCUMENTS

EP    1 667 013    6/2006

OTHER PUBLICATIONS

Lei Wang et al., Design and Implementation of a Novel User Interface for Embedded Systems, International Symposium on the Intelligent Information Technology Application Workshops, pp. 247-250, IEEE 2008. International Search Report from International Application No. PCT/IB2009/006515, dated Feb. 26, 2010.
International Preliminary Report on Patentability from corresponding international application No. PCT/IB2009/006515, 10pgs, dated Feb. 24, 2011.

\* cited by examiner

*Primary Examiner* — Bipin Shalwala
*Assistant Examiner* — Afroza Chowdhury
(74) *Attorney, Agent, or Firm* — Brinks Hofer Gilson & Lione

(57) ABSTRACT

A system includes a touchscreen display and an interface application. The interface application may control the touchscreen display to provide a container and a selectable user interface control. The user interface control may be selected through manipulation of the touchscreen display in an area of the container proximate the user interface control. The user interface application may identify a gesture function in response to manipulation of the touchscreen display in an area of the container when the manipulation has a motion magnitude in a plane of the touchscreen display exceeding a threshold value.

17 Claims, 6 Drawing Sheets

SYSTEM HAVING USER INTERFACE USING OBJECT SELECTION AND GESTURES

CROSS-REFERENCE TO RELATED APPLICATIONS

The present application claims the benefit of priority from U.S. Provisional Application No. 60/981,464, filed Oct. 19, 2007, which is incorporated by reference.

BACKGROUND OF THE INVENTION

1. Technical Field.

The present invention relates to a user interface and, more particularly, to a system having a user interface using objects selection and gestures to interface with a user.

2. Related Art.

Processor-based devices are used in a wide range of applications. MP3 players play audio from stored media content. Video players may display streaming video from a memory storage device, a private network, and/or the Internet. Cellular phones may display streaming video from a memory storage device, a private network, the Internet, and/or another cellular phone subscriber.

Such devices may have an interface to facilitate interaction with the various functions that it offers. The interface may include a hardwired interface and/or a virtual interface. Hardwired interfaces may include pushbutton switches, rotary switches/potentiometers, sliders, and other mechanical elements. Virtual interfaces may include virtual buttons, virtual sliders, virtual rotator controls, function identifiers, and other visual elements. In a combined interface, function identifiers may be positioned on a display adjacent corresponding mechanical based items, such as switches.

The development of a virtual interface may become complicated when the interface displays controls and/or images associated with many functions. The number of controls and/or images generated may result in a crowded display. Display crowding may make it difficult for the user to select displayed objects associated with these functions due to their close proximity with one another.

SUMMARY

A system includes a touchscreen display and an interface application. The interface application may control the touchscreen display to provide a container and a user interface control that is selectable by a user. The user interface control may be selected through manipulation of the touchscreen display in an area of the container proximate the user interface control. The user interface application may identify a gesture function in response to manipulation of the touchscreen display in an area of the container when the manipulation has a motion magnitude in a plane of the touchscreen display exceeding a threshold value.

Other systems, methods, features, and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
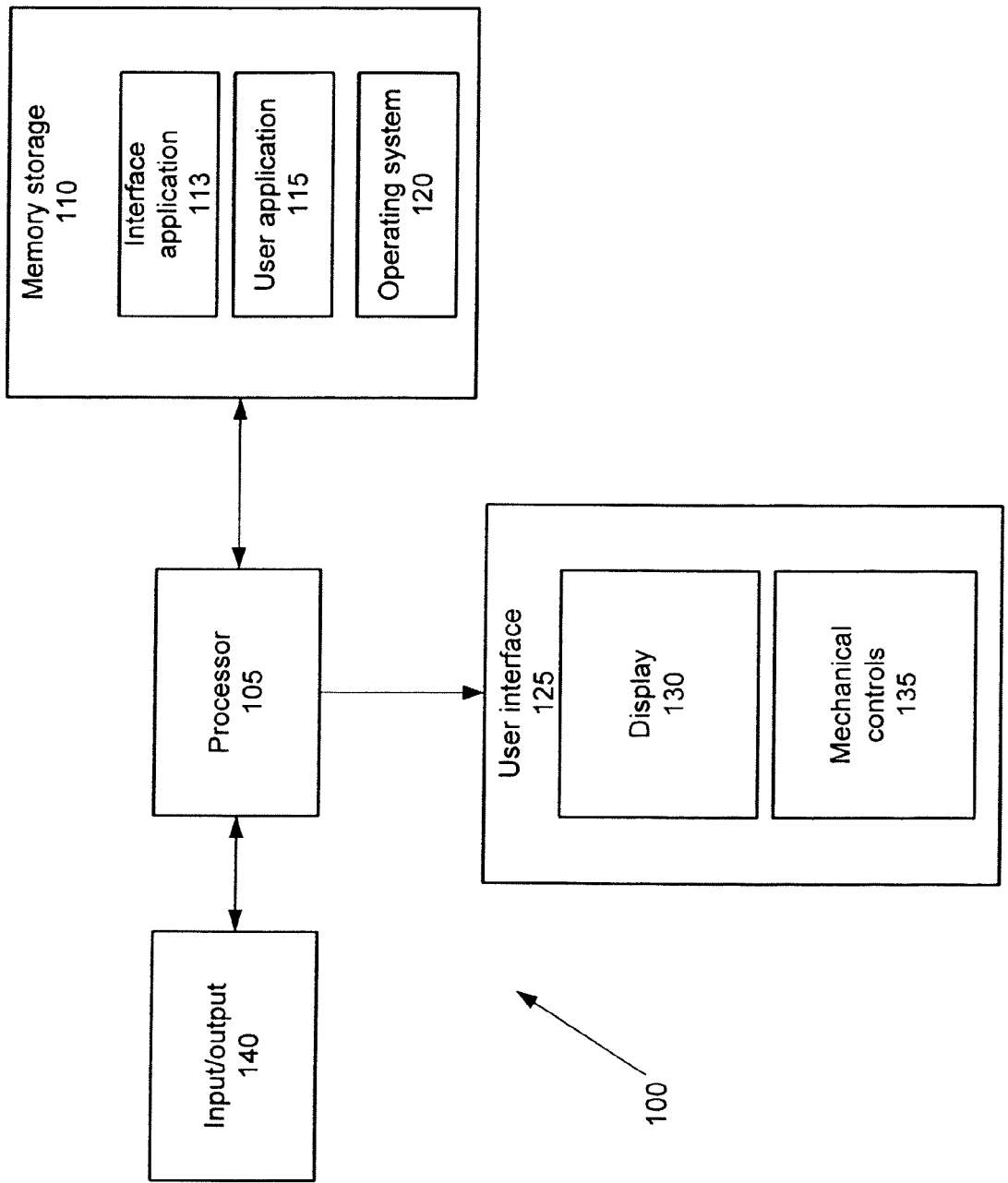
FIG. 1 is a system that includes a user interface that may use object selection and user gestures on a touchscreen display to execute functions.

FIG. 1 shows a system 100 that includes a user interface that may use object selection and user gestures on a touchscreen display to execute functions. System 100 includes a processor 105 that may interface or access a local or remote memory storage 110. Memory storage may retain an interface application 113, one or more user applications 115, and an operating system 120. Interface application 113 may be executable by the processor 105. It may determine how a user interacts with system 100 through user interface 125. User interface 125 may include a display 130, such as a touchscreen display, and/or mechanical controls 135.

Processor 105 may interact with other components through various input/output interfaces 140. Input/output interface 140 may include an Internet gateway, WiFi transceiver, imaging device, USB interface, FireWire interface, an MP3 decoder, DVD decoder or player, receiver, and/or other input and/or output device.

Figure 2:
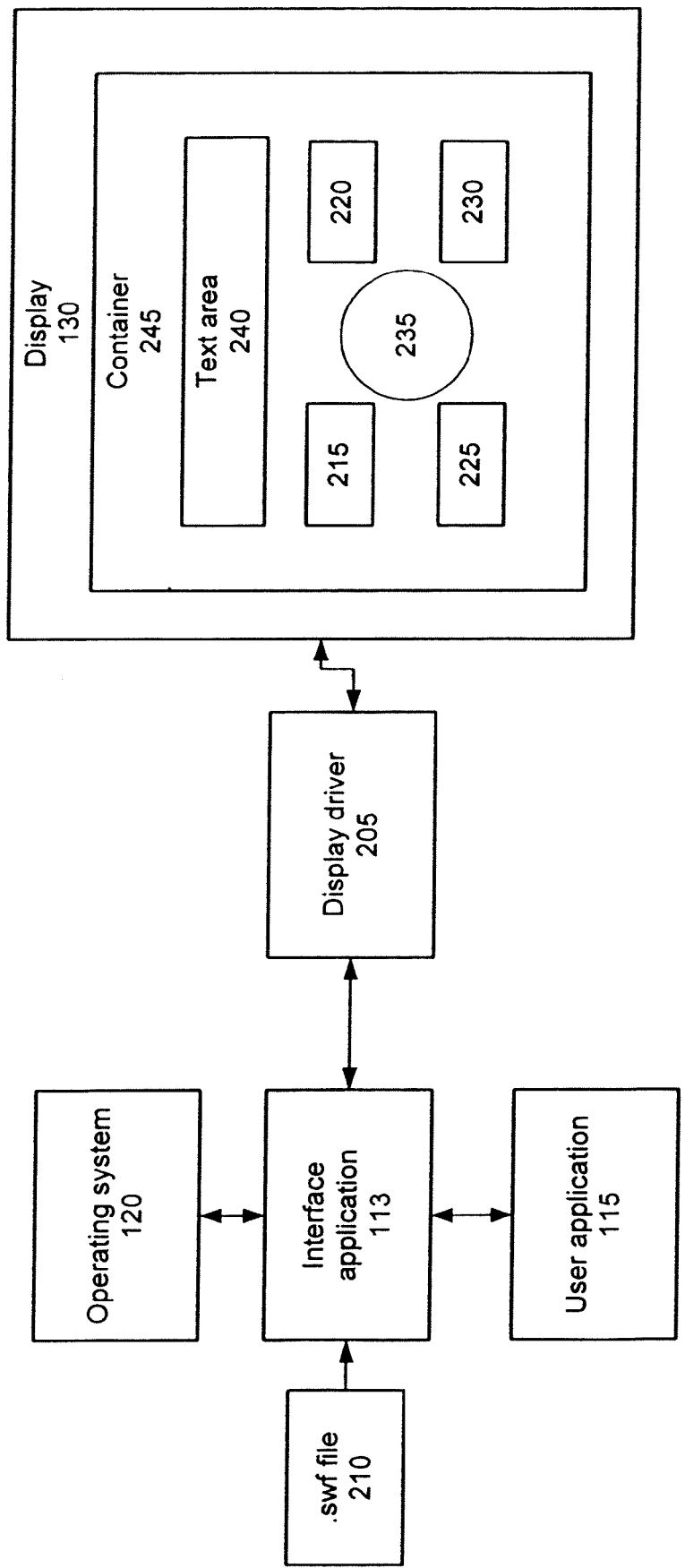
FIG. 2 shows components that may interact with and control the display of the user interface.

FIG. 2 shows how the components of FIG. 1 may interact with and control the display 130 of user interface 125. In FIG. 2, the interface application 113 may interact with display 130 through a display driver 205. Interface application 113 may be a vector and/or movie clip based application, such as a FLASH® player that may be adapted to play a compressed vector format object such as a .swf file 210. The .swf file 210 may include movie clip based controls employed by the user interface 125.

The user interface application 113 may provide controls, such as movie clip based controls, to the display driver 205 for output on display 130 to implement a virtual interface. These controls may be arranged on the display 130 according to user interface application 113. In FIG. 2, the movie based clips include controls 215, 220, 225, 230, and 235, that may be selectable objects. A text area 240 may display input and/or output text. Additionally, or in the alternative, text area 240 may be replaced by or supplemented with an image display area that may display images, such as still images, animations, and/or video. Controls 215 through 235 and text area 240 may be arranged within a container 245, such as a movie clip container in a FLASH® player environment.

Figure 3:
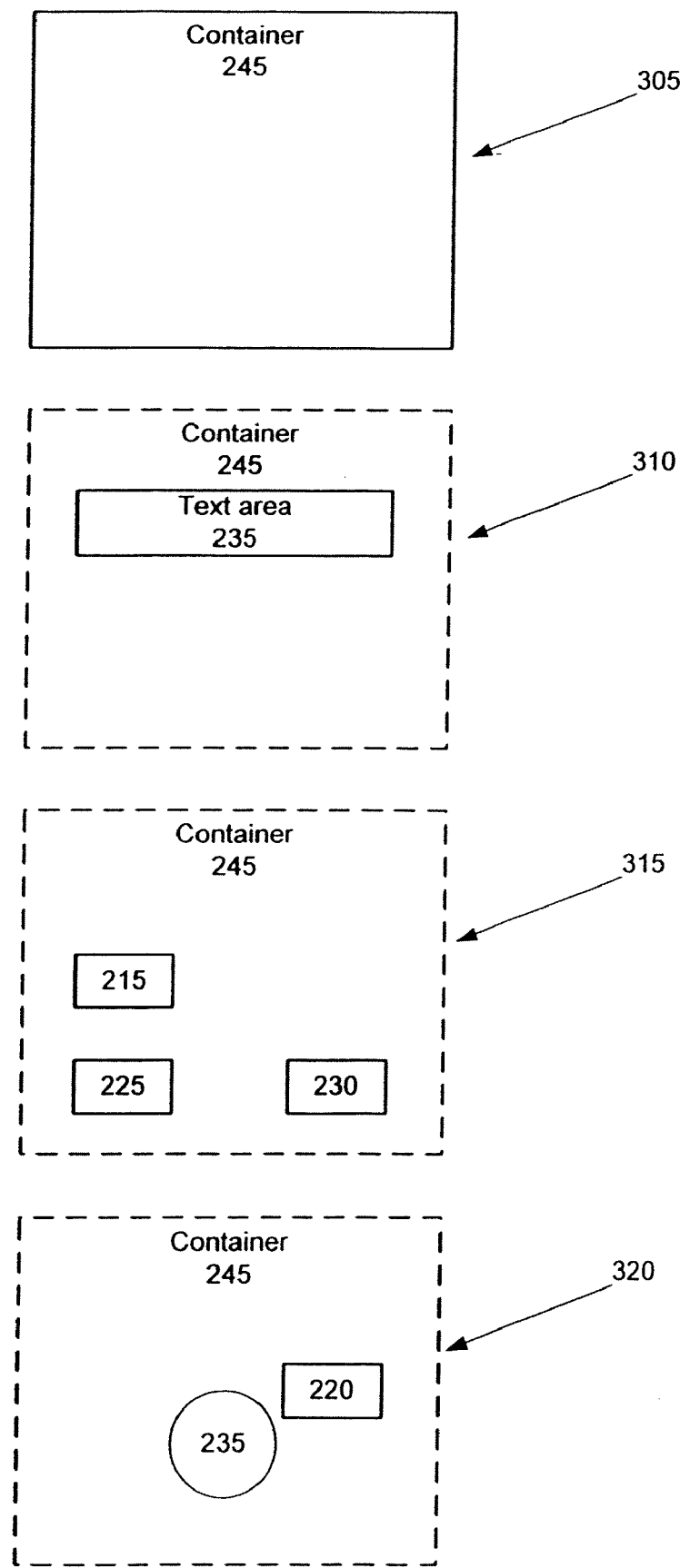
FIG. 3 shows a multilayer arrangement of objects of the user interface with respect to the container.

FIG. 3 shows a multilayer arrangement of the various objects of the user interface with respect to container 245. In FIG. 3, container 245 may be disposed on a first display layer 305. Text area 235 may be disposed in the area of container 245 on a second display layer 310. Selectable controls 215, 225, and 230, may be disposed in the area of container 245 on a third display layer 310. Selectable controls 230 and 235 may be disposed in the area of container 245 on a fourth layer 310. One or more of the selectable controls 215 through 235 may overlap one another on different layers of the multilayer arrangement. Alternatively, or in addition, the selectable controls 215 through 235 may be disposed on the same layer of the arrangement in a non-overlapping configuration. Layers may be visible or translucent (e.g., invisible).

Figure 4:
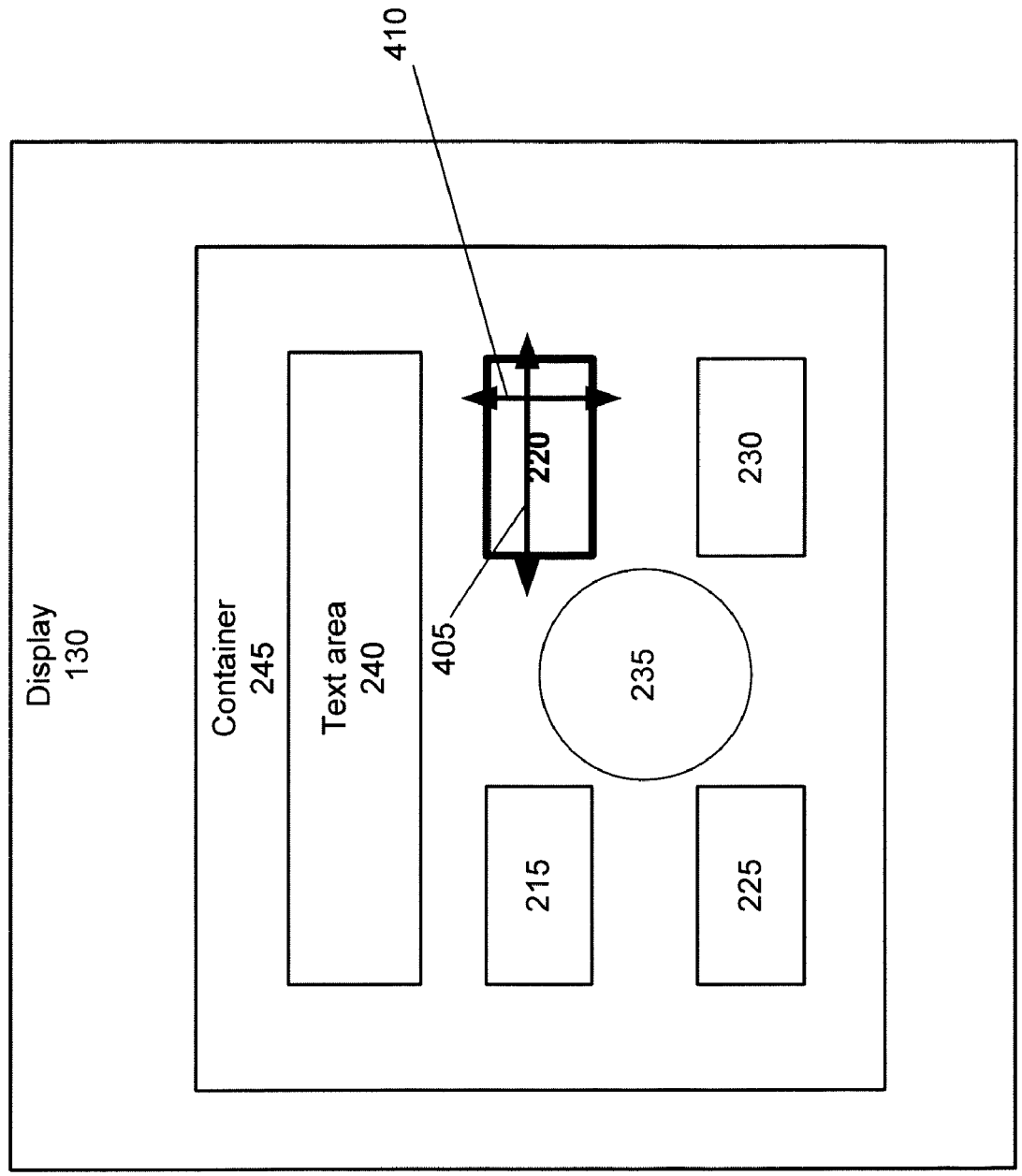
FIG. 4 shows manipulation of the touchscreen display to select an object or control.

FIG. 4 illustrates manipulation of the touchscreen display 130 to select an object/control. In FIG. 4, selection of control 210 is shown. To select control 210, the user may touch the touchscreen display 130 in an area proximate control 210 and within the boundaries formed by arrows 405 and 410. The interface application 113 may identify the manipulation as selection of object 210 when the magnitude of any motion of the manipulation is below a threshold value. The magnitude of the motion may be determined by the difference between the coordinates on the touchscreen display at which the manipulation begins and the coordinates at which the manipulation ends. These coordinates may be obtained by measuring the motion using the container 245. In a FLASH® environment, the magnitude of the motion may be determined using an ActionScript® routine associated with the container 245.

When the magnitude of the motion is below the threshold value on the display level 305 having the container 245, the interface application 113 may execute a hierarchical search of the levels within the container area to determine whether the user has attempted to select an object. The hierarchical search may involve looking through the layers in the area bounded by arrows 405 and 410. If the layers are arranged in a manner shown in FIG. 3, the search may end at layer 320, which includes the selectable control 220.

If a selectable control is found in the area bounded by arrows 405 and 410, the interface application 113 may communicate with another application to execute the function associated with the selectable control. In FIG. 2, the interface application 113 may communicate with the user application 115 and/or the operating system 120. Additionally, or in the alternative, the interface application 113 may execute the function associated with the selectable control automatically.

Figure 5:
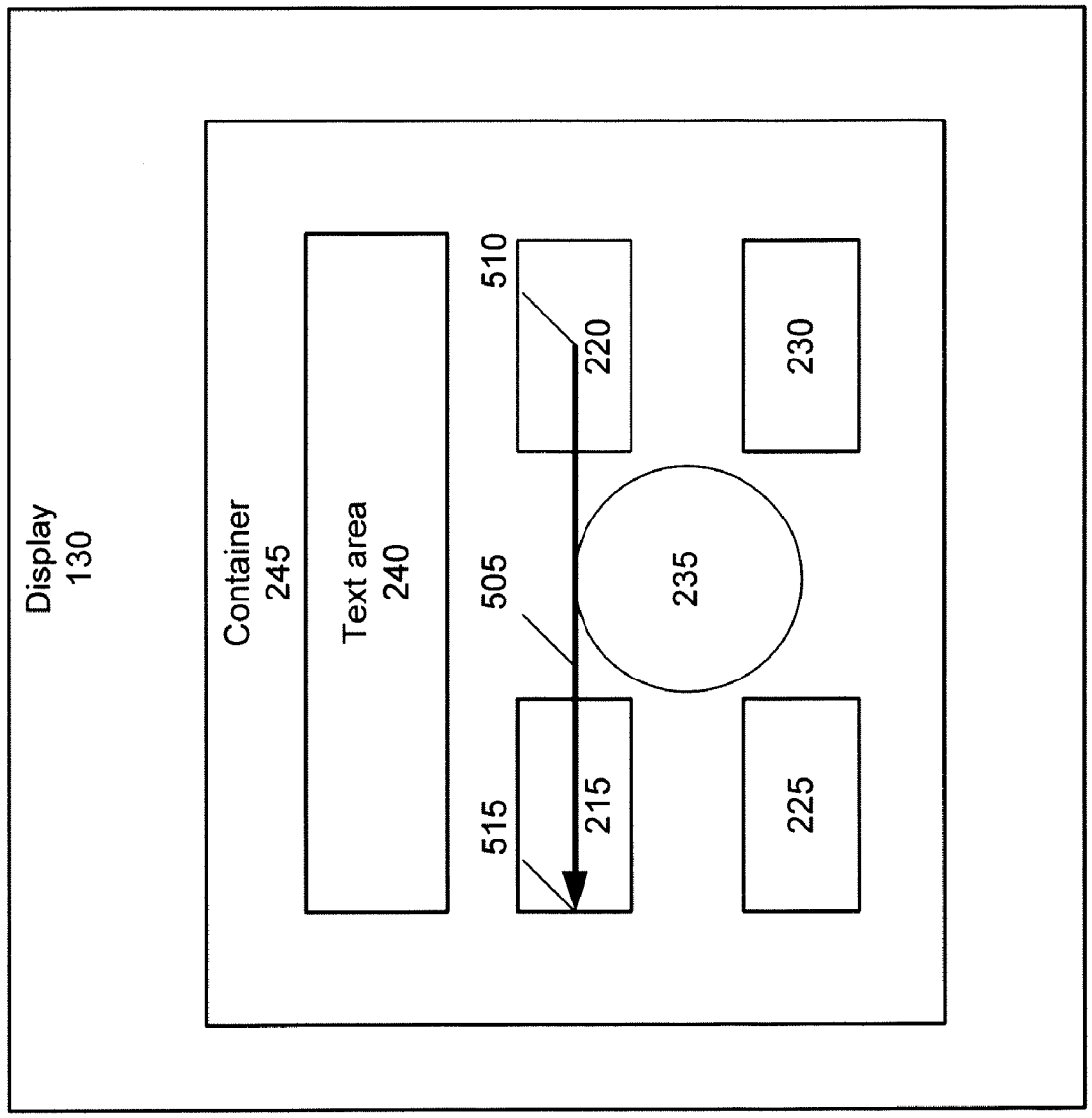
FIG. 5 shows manipulation of the touchscreen display to generate a gesture to execute a corresponding function.

FIG. 5 illustrates manipulation of the touchscreen display 130 to generate a gesture that may be identified by the interface application 113 to execute a corresponding function. In FIG. 5, the user executes a gesture designated by arrow 505. The gesture 505 starts when the user presses the touchscreen display at 510 and discontinues pressing the touchscreen at 515. The interface application 113 determines the magnitude of this motion using the start location 510 and end location 515 of the gesture 505. If the magnitude of this motion/manipulation exceeds the threshold value, the interface application 113 may treat the manipulation as a gesture by the user. The magnitude and/or direction of the motion may be compared to representations of available gestures retained in memory. If a function corresponding to the gesture is found, the function may be executed by the user application 115 and/or operating system 120. Additionally, or in the alternative, the function associated with the gesture 505 may be executed by the interface application 113.

Figure 6:
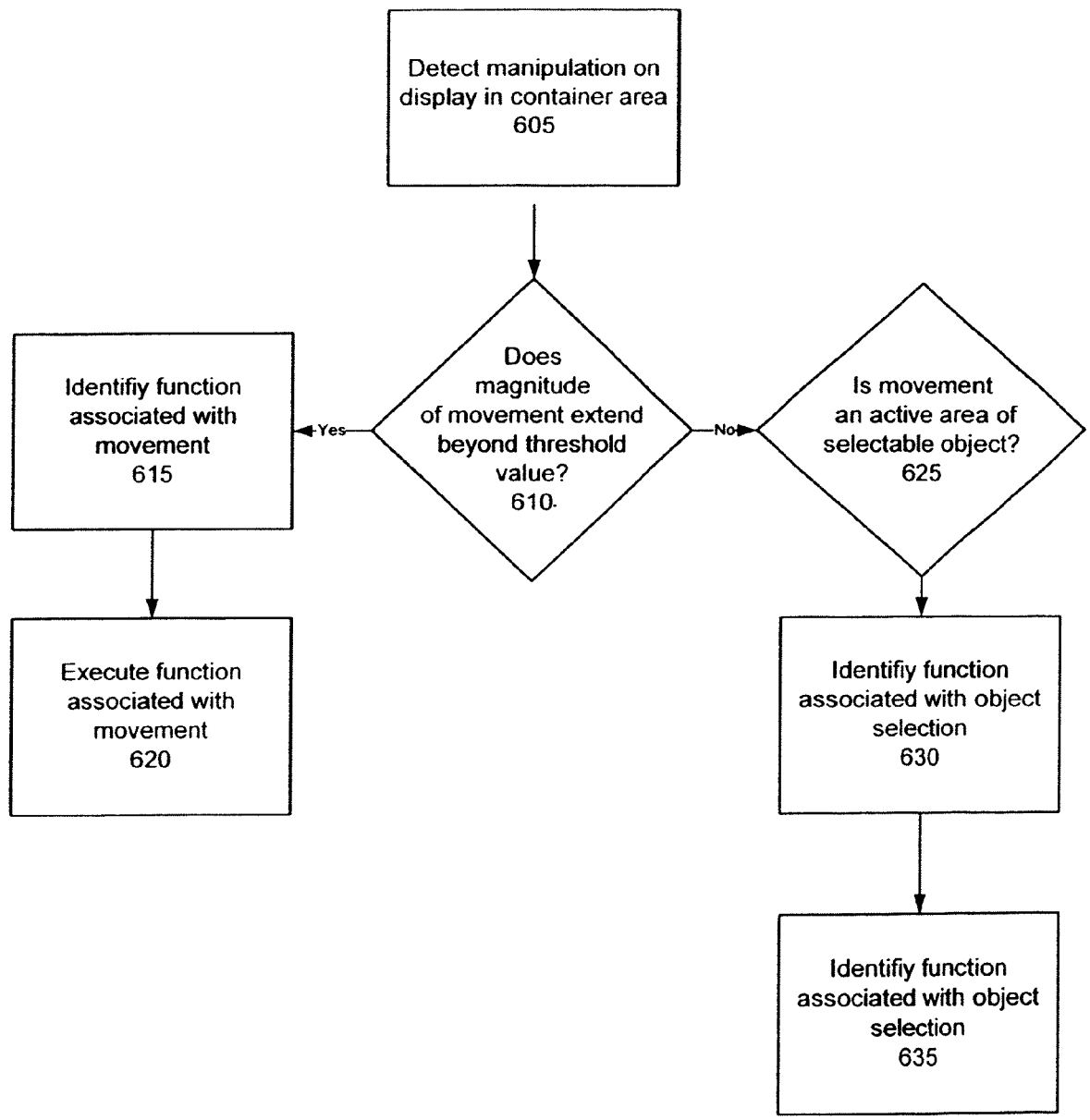
FIG. 6 is a process to implement a user interface having selectable objects and gesture functionality.

FIG. 6 illustrates operations used to implement a user interface having selectable objects and gesture functionality. At 605, manipulation on the display in the area of a container having one or more selectable objects, such as one or more movie clips, is detected. The magnitude of the movement of the manipulation may be compared to a threshold value at 610. If the magnitude exceeds the threshold value, the function associated with the movement may be identified at 615 and executed at 620. If the magnitude of the motion does not extend beyond the threshold value, an operation may be executed at 625 to determine whether the manipulation was proximate an active area of a selectable object. If it was in such an active area, the function associated with the object selection may be identified at 630 and executed at 635.

The methods and descriptions described above may be encoded in a signal bearing medium, a computer readable medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, an entertainment and/or controller of a vehicle or types of non-volatile or volatile memory remote from or resident to a detector. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system, apparatus, device, resident to a vehicle or a hands-free system communication system or audio system. Alternatively, the software may be embodied in media players (including portable media players) and/or recorders, audio visual or public address systems, desktop computing systems, etc. Such a system may include a computer-based system, a processor-containing system that includes an input and output interface that may communicate with an automotive or wireless communication bus through any hardwired or wireless automotive communication protocol or other hardwired or wireless communication protocols to a local or remote destination or server.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium may include: an electrical or tangible connection having one or more wires, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A system comprising:
   a processor;
   a touchscreen display interacting with the processor;
   an interface application executable by the processor to control the touchscreen display, the interface application controlling the touchscreen display to provide a container and user interface controls, the user interface controls including a first user interface control provided on a first layer of a multilayer display arrangement and a second user interface control provided on a second layer of the multilayer display arrangement that overlaps the first layer, where the interface application detects a motion magnitude of a touch or a contact in a plane of the touchscreen display within the container, identifies selection of a selected user interface control of the user interface controls in response to the touch or the contact of the touchscreen display proximate to the selected user interface control when the detection indicates that the touch or the contact has a motion magnitude in the plane of the touchscreen display that does not exceed a threshold value, and identifies a gesture when the detection indicates that the touch or the contact has a motion magnitude in the plane of the touchscreen display that exceeds the threshold value.

2. The system of claim 1, where the container is a movie-based clip.

3. The system of claim 2, where the selected user interface control is a movie-based clip.

4. The system of claim 1, and further comprising a user application executable by the processor, where the user application is responsive to selection of the user interface control as identified by the interface application to execute a function corresponding to selection of the user interface control, and where the user application is responsive to gesture identification as determined by the interface application to execute a function corresponding to the identified gesture.

5. The system of claim 1, and further comprising an operating system executable by the processor, where the operating system is responsive to selection of the user interface control as identified by the interface application to execute a function corresponding to selection of the user interface control, and where the operating system is responsive to gesture identification by the interface application to execute a function corresponding to the identified gesture.

6. The system of claim 1, where the container is disposed on a third layer of a multilayer display arrangement.

7. The system of claim 6, where the interface application executes a hierarchical search of the multiple layers to determine which of the user interface controls is selected in a given area of the container.

8. A system comprising:
   a processor;
   a touchscreen display communicating with the processor;
   an interface application executable by the processor to control the touchscreen display, the interface application providing a container on a first layer of a multilayer display arrangement and a user interface control on a second layer of the multilayer display arrangement overlapping the first layer, where the user interface control is selectable by a user in response to a touch or a contact of the touchscreen display in an area of the container proximate the user interface control when the touch or the contact has a motion magnitude in a plane of the touchscreen display that does not exceed a threshold value, and where the user interface application identifies a gesture function in response to the touch or the contact of the touchscreen display in an area of the container when the touch or the contact has a motion magnitude in the plane of the touchscreen display exceeding the threshold value.

9. The system of claim 8, where the container is a movie-based clip.

10. The system of claim 8, where the user interface control is a movie-based clip.

11. The system of claim 8, further comprising a user application executable by the processor, where the user application is responsive to selection of the user interface control as identified by the interface application to execute a function corresponding to selection of the user interface control, and where the user application is responsive to gesture identification by the interface application to execute a function corresponding to the identified gesture.

12. The system of claim 8, where the container comprises a plurality of user controls disposed on multiple display layers of the multilayer display arrangement.

13. The system of claim 12, where the interface application executes a hierarchical search of the multiple layers to determine which of the plurality of user controls is selected through the touch or the contact of the touchscreen display in a given area of the container.

14. A method of providing a user interface comprising:
   detecting a touch or a contact on a display in a container area having selectable objects, the selectable objects including a first selectable object provided on a first layer of a multilayer display arrangement and a second selectable object provided on a second layer of the multilayer display arrangement overlapping the first layer;
   comparing a magnitude of the movement of the touch or the contact to a threshold value;
   executing a function associated with the movement when the comparison indicates that the magnitude of the movement of the touch or the contact extends beyond the threshold value;
   detecting whether the touch or the contact is in an active area of one of the selectable objects when the comparison indicates that the magnitude of the movement of the touch or the contact is below the threshold value; and
   executing a function associated with a selection of the one of the selectable objects when the touch or the contact is detected to be in the active area of the one of the selectable objects.

15. The method of claim 14, further comprising generating the container area on a third layer of a multilayer display arrangement.

16. The method of claim 15, where the generation of the container area comprises generating the container as a movie-clip using a movie-clip based application.

17. The method of claim 15, where the selectable objects comprise movie-clips generated using a movie-clip based application.

* * * * *